March 28, 1961 M. I. PLACE 2,976,848
LINEARIZED PARALLEL CONTROL VALVE FOR CONTROL SYSTEMS
Filed March 28, 1957 2 Sheets-Sheet 1

WITNESSES:
Bernard R. Gieguey
Leon M. Garman

INVENTOR
Mark I. Place

BY
George C. Thompson, Jr.
ATTORNEY

United States Patent Office 2,976,848
Patented Mar. 28, 1961

2,976,848

LINEARIZED PARALLEL CONTROL VALVE
FOR CONTROL SYSTEMS

Mark I. Place, Pittsburgh, Pa., assignor to Westinghouse Electric Corporation, East Pittsburgh, Pa., a corporation of Pennsylvania Filed Mar. 28, 1957, Ser. No. 649,241

6 Claims. (Cl. 121—41)

This invention relates to a fluid control valve and, more particularly, to a fluid control valve free from the objections of a dead zone in its neutral position.

In some fluid control systems previously used, an encountered dead zone of a fluid power actuator is reduced in effect by circuit anticipation in the control system for the fluid power actuator. This arrangement, however, has the disadvantage of causing a certain amount of overcontrol, upon power actuator movement in response to an incoming signal. This overcontrol results in a hunting of the member being driven by the power actuator which is generally the control surface of an aircraft.

It is, therefore, an object of this invention to provide a fluid control valve arrangement for a fluid power actuator that is free from a central dead zone.

It is another object of this invention to provide an automatic cut-off for the control system of a power actuator during times of fluid failure or control system inoperativeness.

Still another object of this invention is to provide a two-valve parallel control system for a fluid power actuator, the two valves of which have different response and capacity characteristics.

Other objects, purposes and characteristic features will be clear as the description of the invention progresses.

In practicing this invention, there is provided a power actuator having a fluid control system consisting of two control valves connected in parallel. One of the two control valves is of adequate size to provide a high level of power fluid control for the power actuator. The other valve is one of extreme sensitivity and of low power level or capacity but capable of causing immediate power actuator operation in response to a control signal. With the two control valves connected in parallel with the power actuator, the action of the power actuator is one of immediate response and of high capacity.

In each of the several views, similar parts bear like reference characters.

Figure 1:
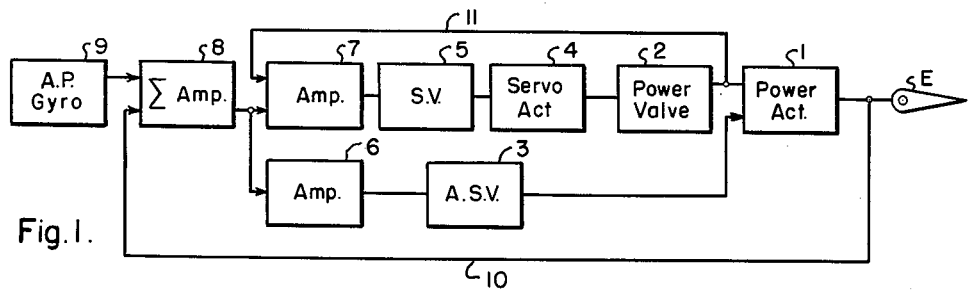
Figure 1 is a view of a typical control system utilizing the power actuator and parallel control valve arrangement and is shown in block diagram form since the elements of the control system not disclosed herein are well known in the art.

The view of Fig. 1 discloses a block diagram showing of the control surface E being powered between two extreme positions by the power actuator 1 provided with two control valves 2 and 3. The control valve 2 is a power control valve of considerable capacity and thus it is necessary to provide this power valve with a servo actuator 4 additionally controlled by a servo valve 5. The second control valve 3, associated with the power actuator 1, is of a small capacity type of valve, as compared to the power valve 2, and controlled by electrical input pulses. The previously mentioned servo valve 5 is also of small capacity and controllable by electrical input pulses. Valves of this type are shown in the copending application of Arne P. Rasmussen and Paul E. Seeley, Serial No. 619,549, filed October 31, 1956, entitled Flight Control Apparatus and assigned to the common assignee. In order to provide adequate control impulses for the auxiliary servo valve 3 and the servo valve 5, the amplifiers 6 and 7, respectively are provided. These amplifiers are of any conventional nature and are therefore not shown in detail. The input signal to the amplifiers 6 and 7 is provided by a summation amplifier 8 which in turn receives its control signals from typical autopilot control gyros, indicated by the block 9 since these are typical autopilot type gyros.

In addition to the gyro input to the summation amplifier, there is provided a feedback circuit 10 responsive to the movement of the power actuator for providing a stabilization signal to the summation amplifier 8. To prevent overcontrol of the power valve 2 by the servo actuator 4, a feedback circuit 11 responsive to the output of the servo actuator 4 is provided for presenting an incoming feedback signal to the amplifier 7. The details of each of the feedback circuits are shown in Fig. 2 to be described hereinafter.

Figure 2:
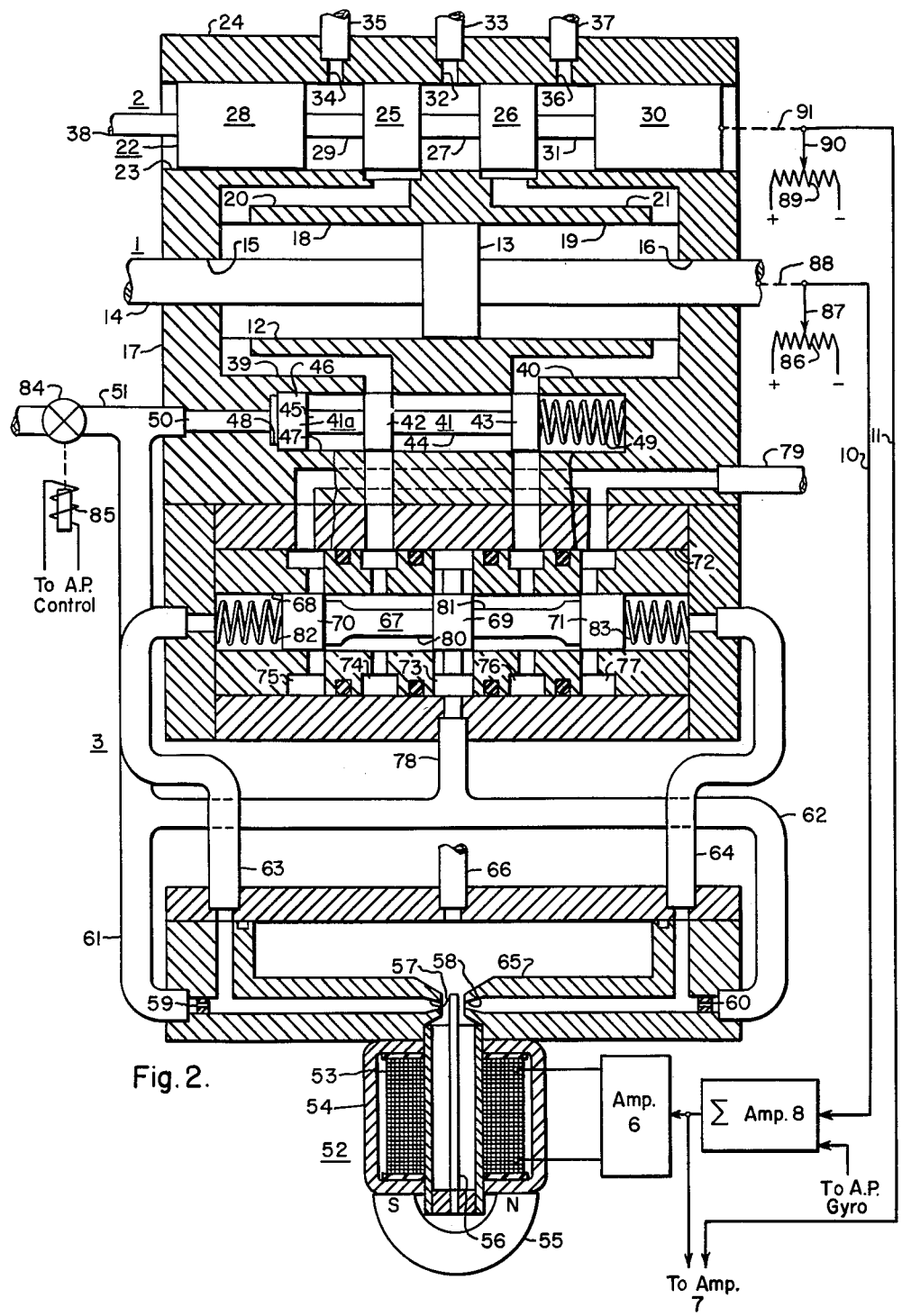
Fig. 2 is a view showing the power actuator and its two parallel connected control valves.

Fig. 2 discloses one arrangement of the power actuator 1 and its parallel control valves 2 and 3. To simplify the explanation, the relationship of the power actuator 1 with the power control valve 2 will be described first.

The power actuator 1 is a reciprocating type power actuator provided with a cylinder or bore 12 and a reciprocating piston 13 secured to an actuating shaft or rod 14 extending through typical bearings 15 and 16 in the surrounding cylinder 12 within the case 17. With the piston 13 positioned equidistance between the ends of the cylinder 12, the cylinder 12 is divided into two chambers 18 and 19. The chamber 18 is provided with a fluid flow pipe 20 capable of delivering or exhausting fluid from the chamber 18. Likewise, the chamber 19 is provided with a fluid flow pipe 21 capable of providing fluid delivery or exhaust from the chamber 19.

The power actuator control valve 2 is provided with a spool valve 22 positioned within a bore 23 and a housing 24 that is integral with the housing 17 of the power actuator 1. The spool valve 22 is provided with a pair of control portions 25 and 26 capable of controlling fluid flow to the fluid control pipes 20 and 21 of the power actuator 1. The control portions 25 and 26 of the spool valve 22 are provided with land areas capable of exactly spanning the width of the opening of the pipes 20 and 21, respectively into the bore 23. During times of no movement of the piston 13 of the power actuator 1, the land areas of the spool valve portions 25 and 26 are in the position necessary to seal the fluid flow pipes 20 and 21. The portions 25 and 26 are maintained in their spaced-apart relationship by a stem 27 of reduced diameter. Spaced outwardly from the spool valve portion 25 is a bore 23 and end sealing portion 28 capable of preventing fluid leakage out of the bore 23. The portion 28 is secured to the spool valve portion 25 by a stem 29 of reduced diameter. Positioned outwardly from the spool valve portion 26 is an end sealing portion 30 for preventing fluid leakage out of the opposite end of the bore 23. The end sealing portion 30 is secured to the spool valve portion 26 by the stem 31 of reduced diameter.

The area of the bore 23 located between the spool valve portions 25 and 26 is provided with an opening 32 connected to a fluid delivery pipe 33. The fluid delivery pipe 33 is connected to a fluid source (not shown) since this is not necessary for a complete explanation of this invention. The area of the bore 23 located between the spool valve portion 25 and the end sealing portion 28 is provided with an opening 34 connected to a fluid return pipe 35. The area of the bore 23 positioned between the spool valve portion 26 and the end sealing portion 30 is likewise provided with an opening 36 connected to a fluid return pipe 37.

The end sealing portion 28 of the spool valve 22 is connected to a control rod 38 which is normally connected to the piston of a servo actuator, such as the servo actuator 4 shown in Fig. 1.

Operation of the power actuator 1 having only the single control power valve 2 will now be described. If we assume that the shaft 38 is displaced in response to servo actuator 4 control movement, with shaft being moved to the right as shown in Fig. 2, it can be seen that the spool valve portions 25 and 26 become displaced from their fluid pipe sealing positions shown in the drawings. When this occurs, the fluid delivery pipe 33 is allowed to deliver fluid to the fluid actuator 1, fluid delivery pipe 21 causing the piston 13 to move to the left as shown in the drawings. At the same time fluid within the chamber 18 of the power actuator 1 is allowed to exhaust through the fluid pipe 20 past the spool valve portion 25 and out the exhaust or return pipe 35. This action continues until the servo actuator 4 returns the spool valve 22 to the position shown in the drawings, at which time the fluid actuator 1 retains its new position. Since the power actuator valve 2 is a large capacity valve, it is incapable of providing immediate fluid response to the pistons 13 of the power actuator 1.

For this reason the present invention provides a second fluid control valve having a very low inertia and capable of immediate response. This valve is designated the auxiliary servo valve 3 in the block diagram showing of Fig. 1. The auxiliary servo valve 3 is connected to the power actuator 1 in a manner similar to a power control valve 2, that is, the chambers 18 and 19 are provided with fluid flow passages 39 and 40, respectively. The fluid passages 39 and 40 are provided with a fluid cut-off valve capable of sealing the passages 39 and 40 during times of inoperativeness. The fluid cut-off valve 41 is also of a spool valve 41a type of structure provided with land areas 42 and 43 capable of covering or sealing the fluid flow pipes 39 and 40. The land areas 42 and 43 are held in spaced-apart relationship by a stem 44 of reduced diameter. The land area 42 is also provided with a stem 45 connected thereto on the side opposite the stem 44. The stem 45 terminates in a piston 46 of a diameter equal to the bore 47 of the cut-off valve 41. The bore 47 of the cut-off valve 41 is provided with a shoulder 48 that is engageable by the piston 46 when in its extreme left-hand position as shown in Fig. 2. This serves to position the land areas 42 and 43 in proper position to cover the fluid ports of the fluid pipes 39 and 40. The spool valve 41a of the cutoff valve 41 is moved to and held in its extreme left-hand position by a bias spring 49 located between the land area 43 and an end wall of the bore 47. The piston 46 is exposed to fluid pressures through a pipe 50 connected to a fluid supply pipe 51. It can be seen that fluid delivery by the fluid supply pipe 51 through the delivery pipe 50 acting on the piston 46 would cause displacement of the cut-off spool valve to the right uncovering both of the fluid delivery pipes 39 and 40. When fluid pressure is removed from the fluid delivery pipe 51, the spool valve is returned to its extreme left cut-off position by the bias spring 49.

With this arrangement, it can be seen that during times of inoperativeness, the auxiliary servo valve 3 is cut off from the power actuator 1 for safety purposes to be explained hereinafter.

The auxiliary servo valve 3 is a lightweight rapid response type of spool valve of the well known two-stage type. A two-stage valve is shown in the copending appliciaton Serial No. 502,471 of Mark I. Place, filed April 19, 1955, now Patent No. 2,824,574, entitled Hydraulic Servo-Valve, and assigned to the common assignee. The first stage of the auxiliary servo valve 3 comprises a vane type of torque motor 52 provided with a drive winding 53 and a magnetic circuit 54 which is polarized by a permanent magnet 55 to respond to currents of different polarity delivered to the coil 53 by any suitable control system such as that shown in Fig. 1. Movement of the vane 56 is in one direction or the other in response to current flow in one direction or the other within the coil 53. In the condition of inoperativeness as shown in Fig. 2, the vane assumes a neutral or a central position through its only resilience. Positioned on opposite sides of and in close proximity to the vane 56, are a pair of orifices 57 and 58. The orifices 57 and 58 are connected through restricted openings 59 and 60, respectively to the fluid delivery pipe 51 by the fluid pipes 61 and 62, respectively. Connected to the fluid pipe between the orifice 57 and the restricted opening 59 is a fluid control pipe 63 used to control a spool valve portion of the auxiliary servo valve as explained hereinafter. Likewise connected between the orifice 58 and the restricted opening 60 is the fluid control pipe 64 also used to control the spool valve portion of this auxiliary servo valve. Fluid delivered through the fluid delivery pipe 51 through the restricted openings 59 and 60 and then through the orifices 57 and 58 is exhausted into a chamber 65 and eventually out through the fluid return pipe 66 to a common reservoir not shown.

The second stage of the auxiliary servo valve 3 comprises a spool valve 67 positioned within a bore 68 and comprising three land areas 69, 70 and 71.

The bore 68 is formed by a series of rings placed within an opening 72. The rings when placed together form a series of peripheral openings 73, 74, 75, 76 and 77. These openings serve as fluid passageways as will be explained hereinafter. The fluid passageway 73 is connected to the fluid delivery pipe 62 by the delivery pipe 78 and serves to deliver fluid to the power actuator 1 during times dictated by the land area 69 of the spool valve 67. The fluid passages 75 and 77 provide fluid exhaust passages from the chambers 18 and 19 of the fluid actuator 1 during times dictated by the land areas 70 and 71, respectively of the spool valve 67. The passages 75 and 77 are connected to the fluid return pipe 79 for fluid return to the fluid reservoir, not shown. The fluid passages 74 and 76 provide fluid flow to and from the fluid pipes 39 and 40, respectively, of the power actuator 1 at times dictated by the land areas 69, 70 and 71 of the spool valve 67. At the position shown in Fig. 2 of the drawings, the land areas 69, 70 and 71 are held in spaced-apart relationship by reduced diameter stem portions 80 and 81, the land areas being positioned so as to exactly shut off or interrupt the fluid flow areas 73, 75 and 77 with the valve 67 in its inoperative condition, as shown. The spool valve 67 is maintained in its central position during inoperative times by the bias springs 82 and 83 positioned between the land areas 70 and 71, respectively, and the ends of the bore 68.

Operation of the auxiliary servo valve and its effect on the power actuator 1 will now be described. If we assume that an incoming signal to the coil 53 is in a direction to cause the vane 56 to deflect to the right as shown in Fig. 2, it can be seen that fluid flow from the orifice 58 becomes restricted while fluid flow from the orifice 57 is relieved. When this occurs, a pressure build-up between the orifice 58 and the opening 60 occurs causing an increase in pressure within the fluid control pipe 64. At the same time, a reduction in pressure takes place between the orifice 57 and the restricted opening 59 causing a reduction in pressure within the fluid control pipe 63. The change in pressures within the fluid control pipes 63 and 64 causes a displacement of the spool valve 67 to the left as shown in Fig. 2. This displacement allows fluid delivery from the fluid pipe 78 past the land area 69 and into the fluid delivery pipe 40, past the fluid cut-off valve 41 and acts to increase the fluid pressure within the chamber 19 of the fluid actuator 1. It should be pointed out that at this time with fluid pressure applied to the fluid delivery pipe 51 that the fluid cut-off valve 41 is in its extreme right-hand position providing unrestricted passage of fluid through the pipes 39 and 40. At the same time fluid within the chamber 18 of the fluid actuator 1 is provided with a relief passage through the fluid pipe 39 into the fluid peripheral passage 74, past the spool valve land area 70, into the fluid peripheral passage 75 and out through the fluid exhaust pipe 79.

If the electrical impulse had been of the opposite polarity to the previously described operation, it can be seen that opposite deflection of the vane 56 would have resulted in displacement of the spool valve 67 to the right and movement of the power actuator piston 13 also to the right.

Figure 3:
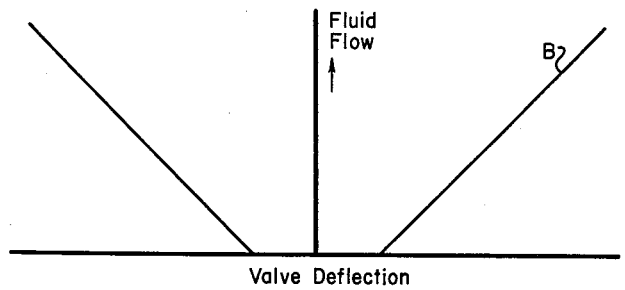
Fig. 3 is a view of a typical curve showing the response of the power actuator with only a high capacity power control valve.
Figure 4:
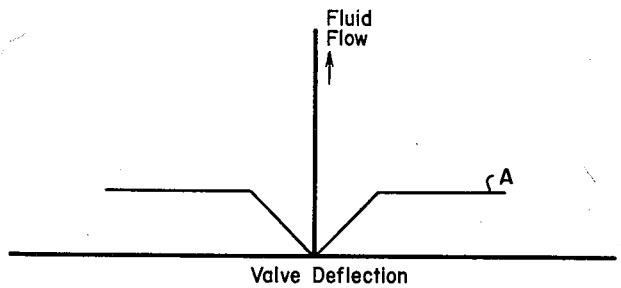
Fig. 4 is a view of a curve showing the response of the power actuator provided with only a low capacity immediate response servo control valve.
Figure 5:
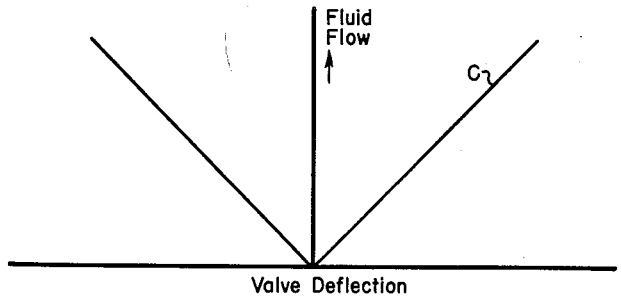
Fig. 5 is a view of a curve showing the response of the power actuator provided with a high capacity power control valve and the immediate response servo control valve connected in parallel.

Since the parts of the spool valve 67 are relatively small and of low inertia, and since the first stage portion of the auxiliary servo valve is of continual fluid flow type of device, fluid delivery to the piston 13 of the fluid actuator 1 in response to electrical impulses to the coil 53 of the torque motor 52 is nearly immediate without the disadvantage of a dead zone. The action of the power actuator 1 in response to the valve 3 is represented by curve A shown in Fig. 4. It is also true that since the parts of the spool valve 67 are small and light in inertia, that the capacity of such a valve is restricted. For this reason the valve is placed in parallel with the power boost valve 2 which is of large capacity and necessarily of greater inertia. The curve B shown in Fig. 3 is the curve of the action of the power actuator 1 in response to the power boost valve 2. It, therefore, can be seen that very desirable results can be obtained through paralleling the power boost valve 2 and the auxiliary servo valve 3 and delivering the output of each of these valves to the chambers 18 and 19 of the power actuator 1. This combined result is shown in curve C of Fig. 5.

A different explanation of the combined result may be given in the following manner. In response to a control impulse, both of the valves 2 and 3 port fluid into the power actuator 1. With the parts of the auxiliary servo valve 3 being of light inertia, this valve predominates in its fluid delivery to the power actuator 1 causing immediate and rapid response of the power actuator 1. As this valve 3 approaches its capacity, the power boost valve 2 is beginning to reach its effective stage of operation and, at this time, acts to take over the delivery of control fluid to the power actuator 1. The power control valve 2 is of a large capacity type of valve and, therefore, can supply all necessary pressures in a zone above the control of the auxiliary servo valve 3 and to the capacity of the power actuator 1.

The fluid delivery pipe 51 is shown provided with a fluid cut-off valve 84 controlled by a typical electrical circuit 85 to responsive autopilot control circuits, not shown, to cause the valve 84 to open during times of autopilot control.

The feedback circuit 10 of Fig. 1 is shown in Fig. 2 as being provided with a potentiometer 86 having variable tap 87 connected by a mechanical link 88 to the output shaft 14 of the power actuator 1. The feedback circuit 11 of Fig. 1 is also shown in Fig. 2 as being provided with a potentiometer 89 having variable tap 90 connected by a mechanical link 91 to the spool valve 22 of of the power boost valve 2. It can be seen that displacement of the shaft 38 by a typical servo actuator 4, causes a variation in the position of the tap 90 of the potentiometer 89 which in turn provides a feedback signal to the amplifier 7 of the system shown in Fig. 1. Likewise, a displacement of the rod 14 of the power actuator 1 in turn causes a displacement of the tap 87 on the potentiometer 86 providing a feedback signal to the summation amplifier 8 shown in Fig. 1.

The invention is not to be restricted to the specific structural details, arrangement of parts or circuit connections herein set forth as various modifications thereof may be effected without departing from the spirit and scope of the invention.

What is claimed is:

1. A power actuator control comprising a first continuously variable control valve of a first capacity level, a second continuously variable control valve having a capacity level substantially higher than said first control valve, a power actuator, said first and second valves being connected in parallel to said power actuator, said first valve causing said power actuator to respond immediately upon first valve actuation, said second valve causing said power actuator to continue uninterrupted continuous operation beyond the capacity level of said first valve.

2. A power actuator control comprising a first continuously variable control valve of a first capacity level, a second continuously variable control valve having a capacity level substantially higher than said first control valve, a power actuator, said first and second valves being connected in parallel to said power actuator, said first valve causing said power actuator to respond immediately upon first valve actuation, said second valve causing said power actuator to continue uninterrupted continuous operation beyond the capacity level of said first valve, and cut-off means for preventing first control valve effect on said power actuator during periods of first control valve inoperativeness.

3. A rapid response fluid power actuator control comprising a first continuously variable fluid control valve having immediate response characteristics and a capacity level, a second continuously variable fluid control valve having relatively slower response characteristics and a capacity level substantially higher than said first fluid control valve, a fluid power actuator, said first and second valves being connected to supply fluid to said power actuator, said first fluid control valve being responsive to electrical impulses, and feedback means responsive to power actuator displacement for providing stabilizing control for said first and second fluid control valve.

4. A control system for an aircraft control surface comprising, a power actuator for said control surface, a power valve for controlling said power actuator, a servo actuator for controlling said power valve, an electrically controlled servo valve for controlling said servo actuator, a first amplifier, a summation amplifier, an autopilot control gyro, said control gyro providing control signals through said summation and first amplifier for said servo valve, feedback means responsive to said power valve for providing stabilizing control for said servo valve through said first amplifier, and auxiliary servo valve means responsive to gyro control signals passing through said summation amplifier for providing immediate control of said power actuator before power valve response to said gyro control signals.

5. A control system for an aircraft control surface comprising, a power actuator for said control surface, a power valve for controlling said power actuator, a servo actuator for controlling said power valve, an electrically controlled servo valve for controlling said servo actuator, a first amplifier, a summation amplifier, an autopilot control gyro, said control gyro providing control signals through said summation and first amplifiers for said servo valve, feedback means responsive to said power valve for providing stabilizing control for said servo valve through said first amplifier, and auxiliary servo valve means responsive to gyro control signals passing through said summation amplifier for providing immediate control of said power actuator before power valve response to said gyro control signals, and second feedback means responsive to said power actuator for providing stabilization control for said servo and auxiliary valves through said summation amplifier.

6. A power actuator control comprising a first continuously variable control valve of a certain capacity level, a second continuously variable control valve having a capacity level substantially higher than said first control valve, a power actuator, said first and second valves being connected in parallel to said power actuator, said first valve causing said power actuator to respond immediately upon first valve actuation, said second valve causing said power actuator to continue uninterrupted continuous operation beyond the capacity level of said first valve, and cut-off means for preventing first control valve effect on said power actuator during periods of first control valve inoperativeness, said cut-off means comprising a spool valve biased to cut-off position by a spring and moved to an unobstructing position upon the introduction of fluid pressure to said first control valve.

References Cited in the file of this patent

UNITED STATES PATENTS

| | | |
|---|---|---|
| 1,231,628 | Lehr | July 3, 1917 |
| 2,533,042 | Polson | Dec. 5, 1950 |
| 2,635,584 | Jacques | Apr. 21, 1953 |
| 2,644,124 | Broadbent | June 30, 1953 |
| 2,649,841 | Jacques | Aug. 25, 1953 |
| 2,733,878 | Ciscel | Feb. 7, 1956 |
| 2,738,772 | Richter | Mar. 20, 1956 |
| 2,777,285 | McDonald | Jan. 15, 1957 |
| 2,781,743 | Mann | Feb. 19, 1957 |

FOREIGN PATENTS

| | | |
|---|---|---|
| 256,652 | Great Britain | Mar. 17, 1927 |
| 1,003,595 | Germany | Feb. 28, 1957 |